(No Model.)
W. N. CARLISLE.
TOE WEIGHT.
No. 518,206. Patented Apr. 10, 1894.
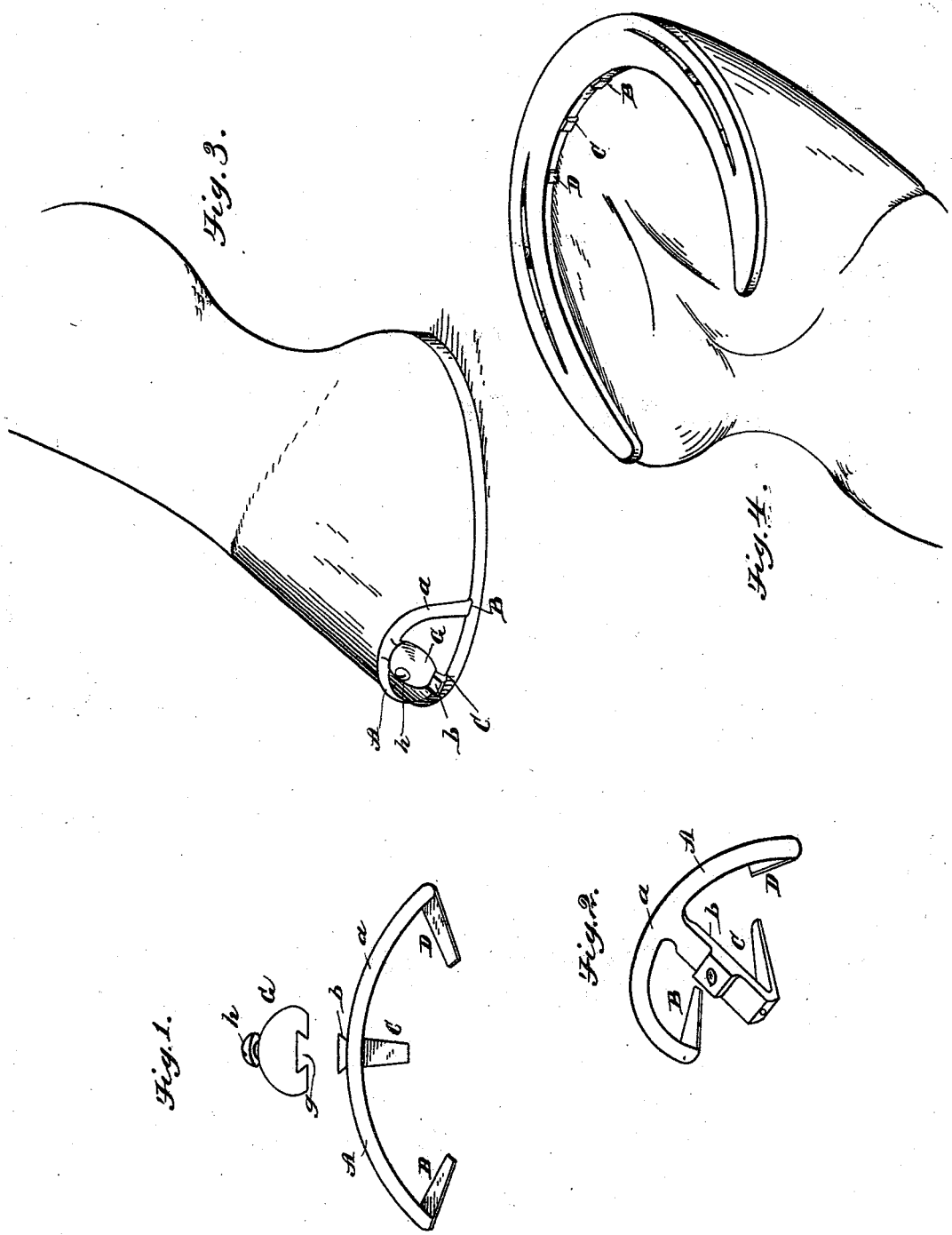
WITNESSES
D. W. Bradford
Effie I. Croft
INVENTOR
William N. Carlisle
by Parker & Burton
Attorneys.

UNITED STATES PATENT OFFICE.

WILLIAM N. CARLISLE, OF DETROIT, MICHIGAN, ASSIGNOR OF ONE-HALF TO GEORGE H. PAINE, OF SAME PLACE.

TOE-WEIGHT.

SPECIFICATION forming part of Letters Patent No. 518,206, dated April 10, 1894.

Application filed May 15, 1893. Serial No. 474,288. (No model.)

*To all whom it may concern:*

Be it known that I, WILLIAM N. CARLISLE, a citizen of the United States, residing at Detroit, county of Wayne, State of Michigan, have invented a certain new and useful Improvement in Toe-Weights; and I declare the following to be a full, clear, and exact description of the same, such as will enable others skilled in the art to which it pertains to make and use the same, reference being had to the accompanying drawings, which form a part of this specification.

This invention relates to toe weights for horses, and has for its object an improvement by means of which the toe weight can be attached to the hoof of the horse without boring into the hoof for the insertion of a screw, as is usual. To accomplish the result, I employ a light frame-work which is secured to the horse's foot at the time the horse is shod, and which remains fixed to the hoof, but is, however, so light that it does not impede the action of the horse. To this frame-work I attach, when desired, the heavier weight, which is the toe weight proper, and which may be varied as may be desired.

In the drawings, Figure 1 is an elevation of the weight and frame. Fig. 2 is a perspective of the frame showing a slight modification. Fig. 3 shows the weight and frame secured to the horse's hoof. Fig. 4 shows the bottom of the horse's foot, showing the means of attaching the frame to the hoof and shoe of the horse.

A indicates the frame, which is made of a bent metal having three prongs, B, C, and D. These three prongs are in a plane from which the bent loop, $a$, rises, and the middle prong C is united to the middle of the bent loop $a$ by a strut, $b$. The bent loop $a$, conforms to the shape of the hoof of the horse. That is, it rises at its middle part about an inch above the plane in which the three prongs B, C and D lie, and the bend between the strut $b$ and the prong C is forward of a straight line let fall perpendicularly from the summit of the curve of the piece $a$ to the plane. This formation permits the toe or extreme forward part of the hoof to fit closely under the curved piece $a$ and the strut $b$, and over the three prongs B, C and D, as shown in Fig. 2.

When the horse is shod, the frame A is placed on the hoof, the shoe is placed below it and nailed to the hoof in the ordinary way, bringing the prongs B, C and D between the hoof and the shoe. The inner ends of the prongs B, C and D are then bent outward enough to prevent the frame from escaping from its position, and the ends of the prongs B, C and D are then trimmed close to the shoe, as shown in Fig. 4. The conformation of the frame, acting in conjunction with the clinched ends of the prongs B, C and D, holds the frame very securely in place. The strut $b$ is wider on its outer side than on its inner side, giving it a dovetailed cross section, as indicated in Fig. 1; and on this strut a toe weight G, having a dovetailed opening $g$ at the rear side of it, is placed and securely held by a jam screw $h$. This weight G may be of any desired size, and will be securely held in place by the screw.

The entire frame A is made of light metal, so that it can be readily formed, or twisted slightly, to make it fit any hoof, and is thus applicable to either large or small hoofs, as may be desired. There are on this toe weight no projecting ends in which straw or sticks or straps can catch, and the entire framework remains in place, forming no impediment to the free action of the horse, but is ready at all times to receive and hold a weight of any desired size.

Instead of being dovetailed, the strut may be slightly thickened at its middle part, and provided with a screw threaded hole as shown in Fig. 2; the toe weight is then secured to the frame by a screw which traverses it and engages with the threads of the hole.

What I claim is—

1. In combination with a toe weight, a frame adapted to hold the same to the hoof, having a loop adapted to extend over the toe of the hoof, and prongs adapted to extend between the hoof and the shoe and to be secured in place by bending the prongs behind the shoe, substantially as described.

2. In combination with a toe-weight, a frame comprising the looped portion $a$, terminating with inturned prongs B and D, and the strut portion $b$, terminating with an inturned prong C, substantially as described.

In testimony whereof I sign this specification in the presence of two witnesses.

WILLIAM N. CARLISLE.

Witnesses:
CHARLES F. BURTON,
EFFIE I. CROFT.